US005278588A

United States Patent [19]

Kubelik

[11] Patent Number: 5,278,588

[45] Date of Patent: Jan. 11, 1994

[54] ELECTROGRAPHIC PRINTING DEVICE

[75] Inventor: Igor Kubelik, Mississauga, Canada

[73] Assignee: Delphax Systems, Canton, Mass.

[21] Appl. No.: 702,582

[22] Filed: May 17, 1991

[51] Int. Cl.[5] ........ G01D 15/06

[52] U.S. Cl. ........ 346/159

[58] Field of Search ........ 346/159

[56] References Cited

U.S. PATENT DOCUMENTS

| | | | |
|---|---|---|---|
| 4,160,257 | 7/1979 | Carrish | 346/159 |
| 4,408,214 | 10/1983 | Fotland et al. | 346/159 |
| 4,628,227 | 12/1986 | Briere | 346/159 X |
| 4,658,275 | 4/1987 | Fujii et al. | 346/155 X |
| 4,675,703 | 6/1987 | Fotland | 346/159 |
| 4,697,196 | 9/1987 | Inaba et al. | 346/159 |
| 4,803,503 | 2/1989 | Mayer | 346/159 |
| 4,879,569 | 11/1989 | Kubelik | 346/159 |
| 4,891,656 | 1/1990 | Kubelik | 346/159 X |
| 4,992,807 | 2/1991 | Thomson | 346/159 |
| 5,027,136 | 6/1991 | Fotland et al. | 346/159 |
| 5,068,961 | 12/1991 | Nishikawa | 346/159 |
| 5,095,322 | 3/1992 | Fletcher | 346/159 |
| 5,104,076 | 4/1992 | Caley, Jr. et al. | 346/159 |

*Primary Examiner*—George H. Miller, Jr.
*Attorney, Agent, or Firm*—Lahive & Cockfield

[57] ABSTRACT

An electrographic printhead is operated to focus charged particles on a print member. In one embodiment successive electrodes are maintained at potentials that define increasing electric field strengths in the successive regions along the particle trajectory. In another embodiment, a thick electrode face defines equipotential lines that shape a sharply focusing electrostatic field that penetrates the projection apertures of the printhead. Improved focusing diminishes charge spreading effects, and allows effective positioning of the printhead at greater spacings to reduce the risk of arcing without loss of print resolution.

11 Claims, 5 Drawing Sheets

ELECTROGRAPHIC PRINTING DEVICE

BACKGROUND OF THE INVENTION

The present invention relates to electrographic printers of the type wherein a printhead generates charge carriers and directs them at a recording or imaging member to form a desired image by the selective activation of electrodes. It is particularly directed to such printers wherein one set of electrodes is activated as a source of charge carriers, e.g., ions or electrons, and a second set of electrodes is activated to extract and accelerate the charge carriers toward the latent imaging member.

Printheads of this type are described in U.S. Pat. Nos. 4,160,257, 4,628,227, 4,992,807, and others. In the printheads described more particularly in the aforesaid patents, a set of electrodes are activated with an RF frequency signal of up to several thousand volts amplitude to create a localized corona or glow discharge region. Lesser control voltages are applied to one or more control electrodes located at or near the discharge region to gate positive or negative charge carriers from the region, and the printhead is biased with respect to a dielectric member to maintain an accelerating field therebetween, so that the charge carriers are drawn from the printhead and deposited as charge dots constituting a latent image on the dielectric imaging member as it moves past the printhead.

In printing devices using this type of printhead, the RF-driven corona generation lines extend along the width of the printhead, spanning many of the control electrodes, which cross them at an angle. One commercial embodiment, by way of example, has twenty parallel RF lines, which are crossed by one hundred twenty eight oblique control electrodes, known as finger electrodes. During the time when one RF line is activated by a burst of approximately five to ten cycles of a one to three MHz drive signal with a peak to peak amplitude of approximately 2700 volts, those finger electrodes which cross the RF line at the desired dot locations are activated to deposit charge dots.

In the conventional drive circuitry for such systems, the RF drive lines are actuated in a fixed sequence independent of the image being printed, while during any given RF line actuation, the number of finger electrodes which are actuated varies in accordance with the required number and location of dots for the pattern being printed. After a slight delay for the RF voltage to ramp up, the designated finger electrodes are turned on to cause charge carriers to pass from the printhead and accelerate toward the drum, belt or other latent imaging member. Specifically, during their "OFF" cycle, each finger is back biased by several hundred volts with respect to the screen voltage. During its "ON" cycle, the finger voltage is switched to approximately the same potential as the screen, so charge carriers of one polarity reaching the screen aperture are drawn to the imaging member.

In the original printers of this type, the finger electrodes were switched on for a fixed interval substantially co-extensive with the RF corona generation burst. Such operation produces a fixed amount of charge per actuation. More recently, in U.S. Pat. No. 4,841,313 or 60 Nathan K. Weiner, constructions with a finger pulse of varying duration have been proposed. This operation varies the amount of charge deposited at each dot. In U.S. Pat. No. 4,992,807 of Christopher W. Thomson, other control regimens involving varying voltage levels or potential differences in the front electrodes or electrode structures have been described.

Printheads of the aforesaid type are generally operated at a relatively small gap of about 0.25 mm from the image-receiving belt or drum surface, and are biased, with respect to the imaging member, to maintain a relatively high electrostatic acceleration field of 2–3 KV/mm in the gap. The size of the charged particle beams generated by the printhead decreases with higher acceleration field. Considerations of assuring a dependable firing threshold while not risking the occurrence of arcing generally prevent the use of extreme values for either printhead gap or acceleration field operating parameters, and dictate bias voltages and gap spacings in the range indicated above.

The operation of such closely-spaced imaging member and printhead electrode arrays at voltages effective to provide small beam dispersion requires voltages as high as fifty percent or more of the spark breakdown voltage, and may lead to erratic arcing or irregular toning of the latent image, so various attempts have been made in the past to reduce the potential difference across the printhead-to-drum gap. In U.S. Pat. No. 4,658,275 a construction is proposed that places a second screen electrode between the printhead and an imaging belt, with the second screen electrode and a conductor on the opposite side of the imaging belt maintained at the same potential to eliminate any electric field in the gap and prevent extraneous charging or toning of the belt. Others in the industry have proposed additional electrodes located closer to a drum with a grounded core, and maintained at potentials closer to ground to permit reduction of the printhead-to-drum gap, and hence limit the beam divergence.

Generally, charge-deposition printheads deposit a quantity of charge for each print dot in an amount that is sufficient to attract and hold toner onto the imaging member. For one typical dry-toned embodiment, the latent image surface potential required for toning may be between fifty and several hundred volts in charged areas. With such a significant potential, as charge is deposited on the imaging member, the latent image electric field builds up to such magnitude that the projected charge particle beam becomes increasingly divergent, so that the latent image charge dot spreads out. This charge spreading effect can result in the deflection of a substantial portion of the charge of one dot into an annulus outside of the intended dot area, "spreading" the dot dimension by several mils. When the printhead dimensions and operating parameters of a system have been optimized to print images with a resolution of several hundred dots per inch or more, the charge spreading effect can degrade print quality, resulting in loss of print density, loss of print detail, and blurring of color separation in multiply-toned prints.

SUMMARY OF THE INVENTION

Accordingly, it is an object of the invention to diminish charge spreading effects.

It is another object of the invention to provide a well focused charged particle beam array while reducing arcing and unwanted discharge between a printhead and an imaging member.

These and other objects of the invention are attained in a printhead structure wherein a first array of electrodes generates charged particles, and a second array, preferably comprising a first screen electrode surface and a second screen electrode surface energized with different potentials, forms successively greater acceleration fields between the first array and an imaging member. In the preferred embodiment, the distance $d_1$ between the first screen electrode and the second screen electrode is advantageously substantially less than the distance $d_2$ between the second screen electrode and the imaging member, and the second screen is maintained at a relatively high potential difference with respect to the imaging member. In particular, for depositing a maximum latent image potential $V_{max}$, the second screen/-drum voltage difference $V_s$ and the voltage difference $V_f$ between the first and the second screens satisfy $$\frac{V_s - V_{max}}{d_2} > \frac{V_f}{d_1}$$

In another embodiment the second array is formed of a single thick conductor, having a transversely-oriented surface defining equipotential lines of a non-linear aperture-penetrating focusing field. In this embodiment, the aperture is preferably beveled outwardly toward the imaging member.

In preferred embodiments of the two screen printhead, the screens are separated by a distance that is substantially less than the printhead gap, and preferably the printhead array is positioned at least 0.2 mm from the imaging member.

BRIEF DESCRIPTION OF THE DRAWINGS

These and other features of the invention will be understood from the description herein, taken together with the drawings wherein.

DETAILED DESCRIPTION

Figure 1:
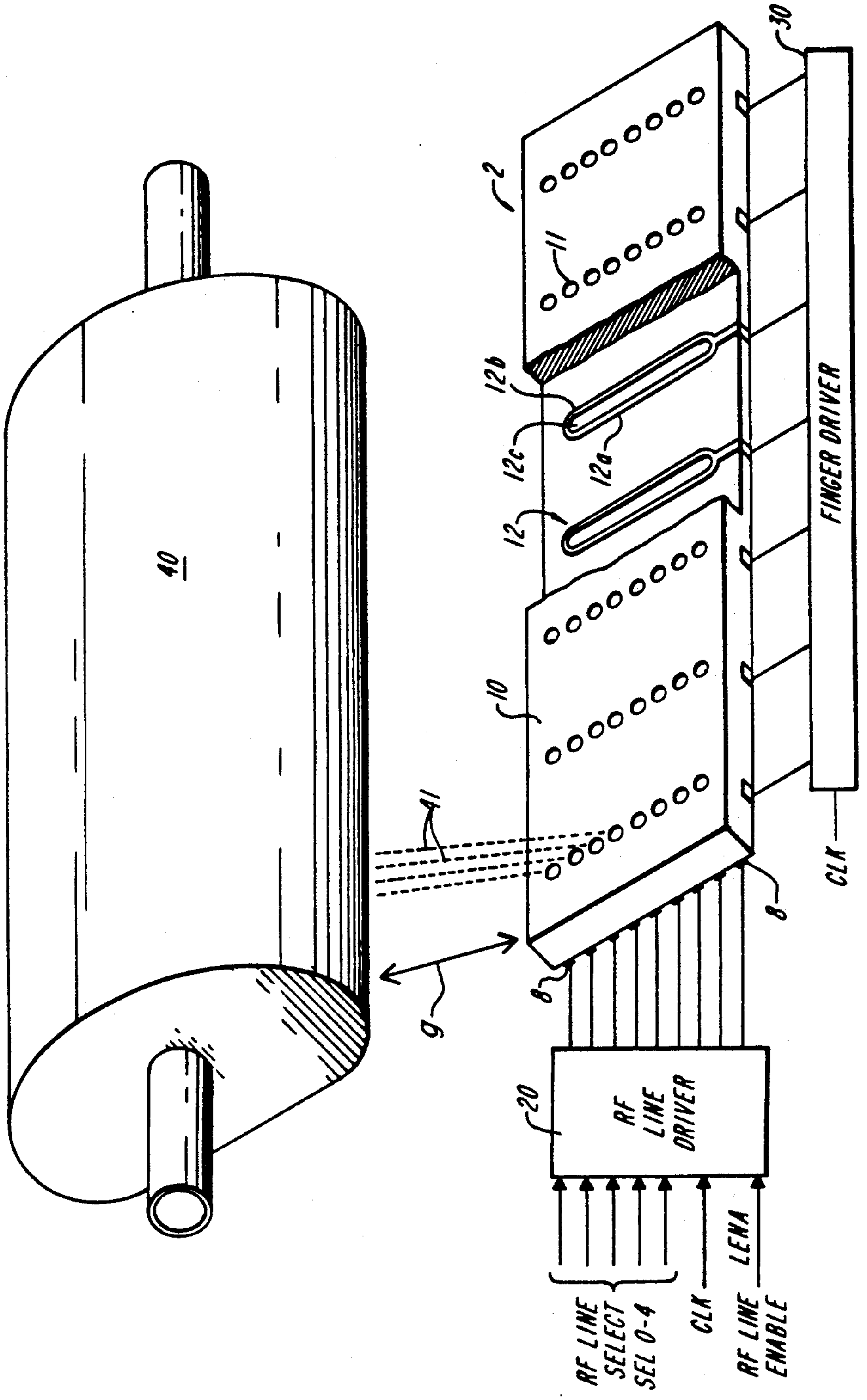
FIG. 1 (PRIOR ART)
FIGS. 1, 2 and 2A illustrate prior art printer or printhead constructions and variations thereof.

FIG. 1 illustrates a printhead 2 and a drum imaging member 40 of a prior art system described above, wherein charged particles 41 are directed from apertures 11 to deposit charge dots constituting a latent charge image on the surface of the member 40, which may be a drum, belt, sheet recording member, or the like. The gap "g" is greatly exaggerated for clarity of illustration.

In this construction a first array of electrodes constituted by a set of longitudinal drive electrodes 8 and a set of transverse "finger" electrodes 12 are actuated by driver units 20, 30 to develop localized pools of charged particles in regions 12*c* adjacent to edges 12*a*, 12*b* of the finger electrodes 12. A large potential difference exists between the finger electrodes 12 and a ground plane (not shown) just below the surface of member 40, and a screen electrode 10 positioned between the first array and member 40 shields the charge generating structure from the high field in the printhead-drum gap. Screen electrode 10 is shown as a continuous conductive sheet having apertures in registry over the electrode crossing points of the driver/finger array but the screen may be implemented as a plurality of separate screen electrodes, each over one or more, e.g., a row or column of, apertures. Also, the screen apertures may be slots that span a plurality of different charge generating loci. In lieu of a single screen electrode over each crossing point, two or more layers of electrode structures may be provided to shield the first electrode array while extracting or accelerating charge carriers toward the drum.

Figure 2:
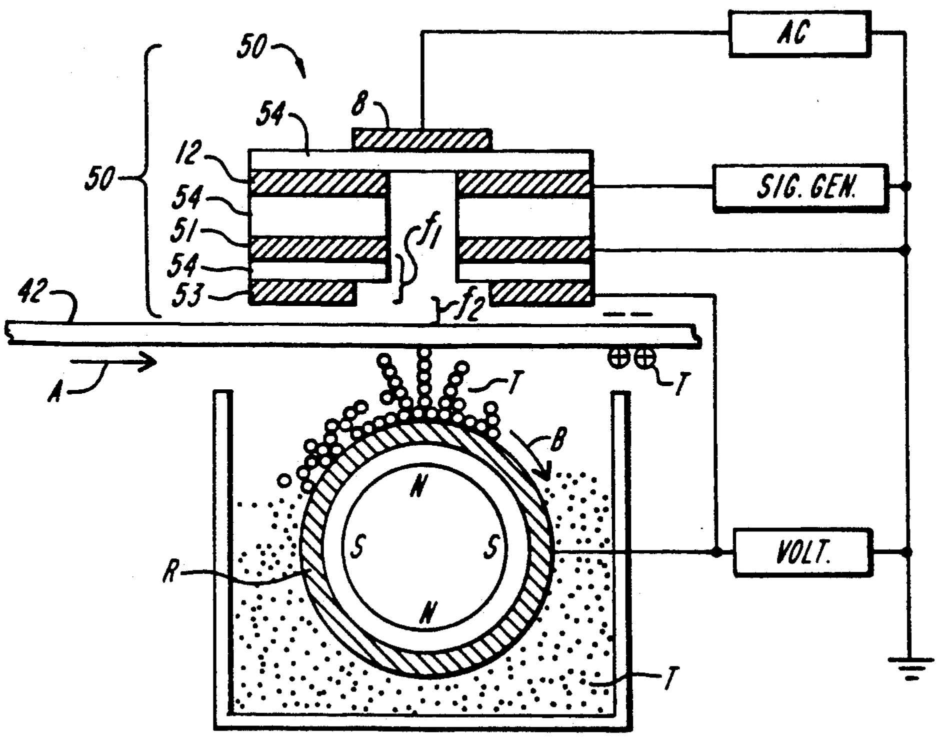
Figure 2A:
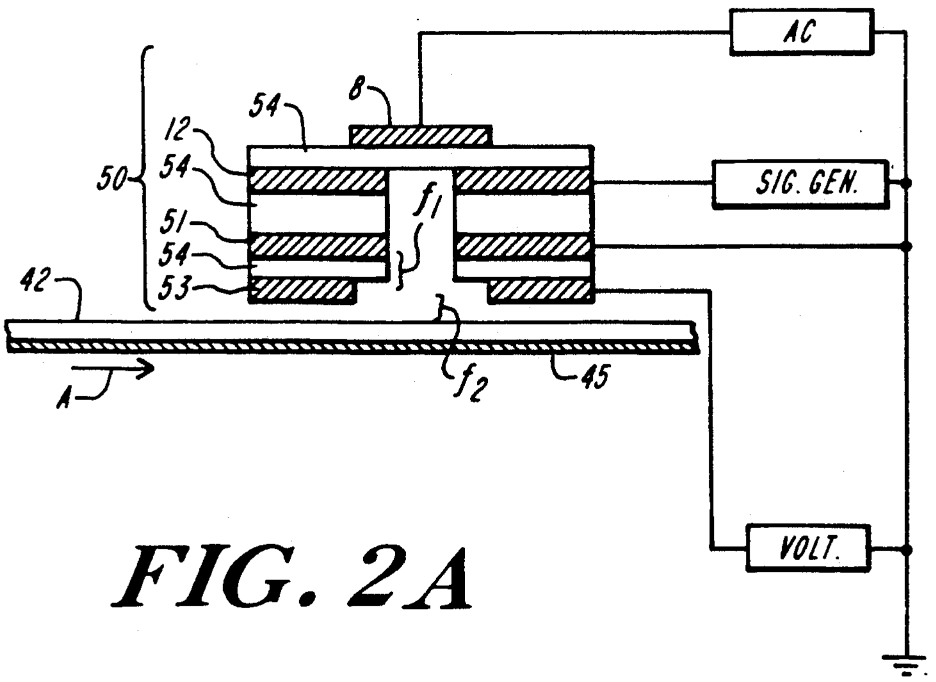

FIG. 2 illustrates in cross-section one electrode set of an embodiment of a prior art printhead 50 employing two screen electrodes 51, 53 in its charge extraction system, as appears in U.S. Pat. No. 4,658,275. A plurality of insulating layers 54 separate the various electrodes, and an RF driver/finger electrode array, numbered identically to the corresponding structure in FIG. 1, provides a source of charged particles. That system applies charge to the back side of a dielectric belt 42, and a conductive toner roll R applies toner particles T to adhere to the other side of the belt. In this construction, a common potential is applied between the toner reservoir and the front electrode, so no acceleration field $f_2$ exists in the printhead-to-belt gap. In the more commonly available commercial embodiments of "ionic" or electrographic printing wherein a drum or belt is charged and toner is applied from the same side in a later step, the conductive toner roll would correspond to a conductive backplane commonly provided as a sublayer of the imaging belt or drum. Such a hypothetical modification of the prior art is illustrated in FIG. 2A.

Figure 3A:
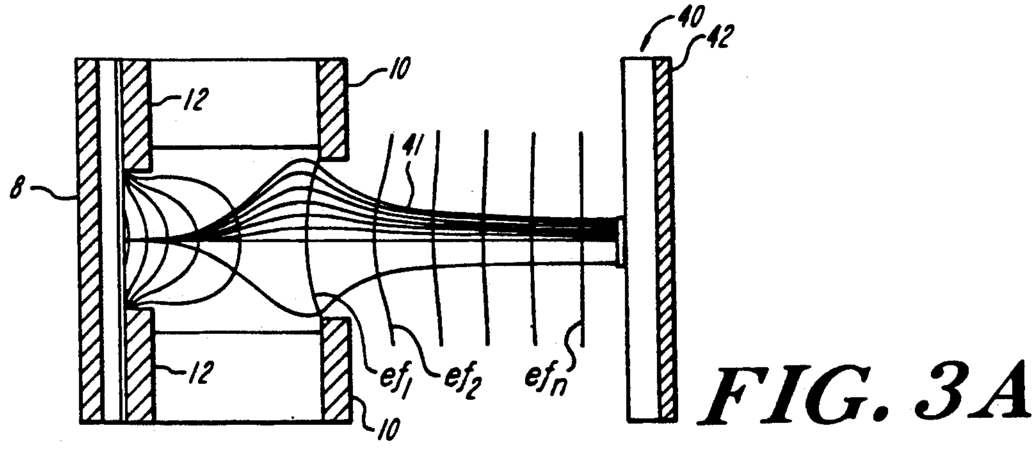
FIGS. 3A and 3B illustrate charge spreading and field effects in a prior art printer.
Figure 3B:
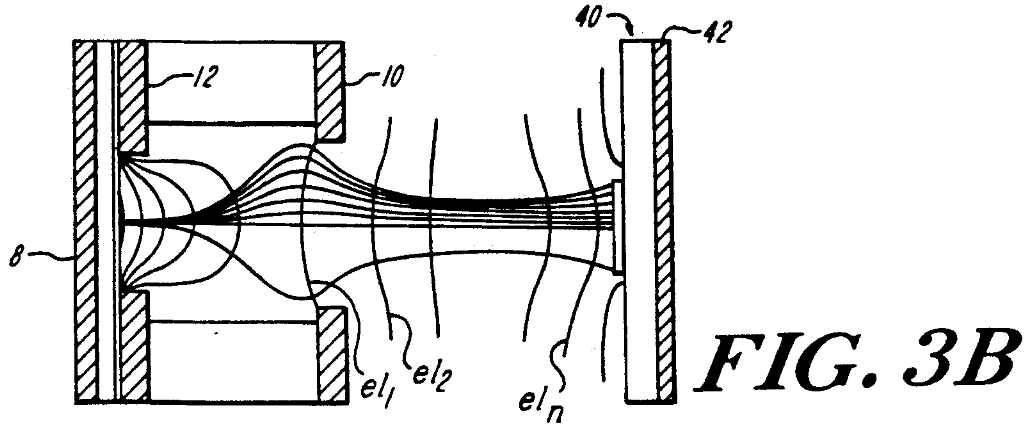

Turning now to FIGS. 3A, 3B there is illustrated in a schematic manner the equipotential electric field lines "$ef_i$" of a conventional single-screen printhead at one charge projecting electrode set during different phases of a charge-depositing operation. By way of scale, the gap between screen electrode 10 and imaging member 40 is typically about 0.2 mm, and the total potential difference 400–700 volts. The equipotentials are identified by sequential numbers, $ef_l$, ...$ef_n$ to indicate their relative positions near to the screen (low subscripts) or near to the imaging member (subscripts close to n.) As illustrated, the field shape near the screen has a moderately convergent or focusing effect on the beam, but quickly flattens out so that once the charged particles have left the printhead they are accelerated along, but not appreciably diverted from their parting trajectory. This model applies to operation of the screen when no charge has yet been deposited on the imaging member and the bias with respect to the conductive backplane 42 presents a substantially uniform accelerating field.

As a charge dot is deposited, however, the surface potential on the imaging member rises by up to several hundred volts. This not only reduces the accelerating potential in the gap, but produces a locally non-uniform electric field. As shown in FIG. 3B, the equipotential lines in this later stage are therefore bent as they approach the latent image dot, with those lines closer to the imaging surface producing a diverging effect on the trajectories of charge carriers 41. The particle bundle therefore blooms outwardly, broadening the charge dot. The exact beam trace size depends in part on how narrow the beam is as it leaves the printhead aperture.

Applicant has calculated that the foregoing dot size can be substantially reduced by providing an electrode geometry and gap field such that the original charge carrier beam is highly focused. This is achieved by novel electrode geometries together with the application of focusing potentials as described further below.

Figure 4:
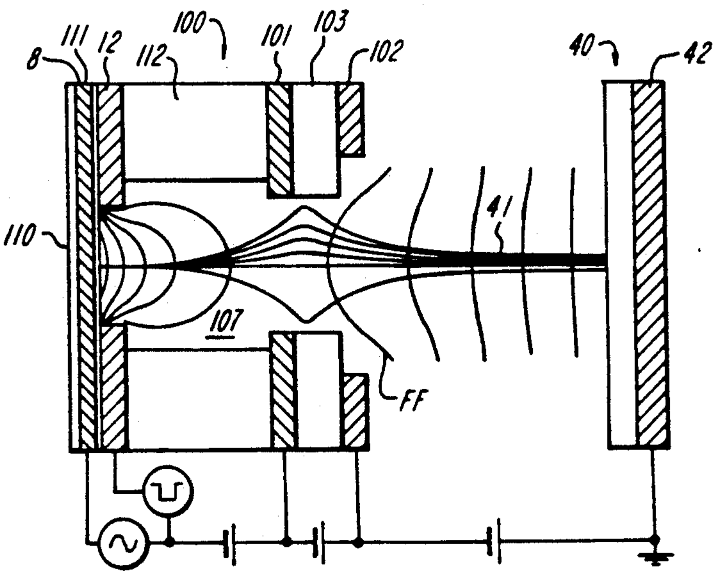
FIG. 4 illustrates in cross-section a printhead in accordance with the present invention.

One such printhead electrode structure 100 is illustrated in FIG. 4. In this embodiment a rear charge generation structure including RF and finger electrodes 8, 12 separated by an insulating film 111 generates particles that are accelerated out by an extraction assembly 101, 102, 103 spaced apart by a spacer layer 112 that defines a glow chamber 107. Insulating RF electrode coating 110 is shown for completeness, but is not material to the inventive aspect of this printhead.

Between driver 8 and first screen electrode 101 the assembly is substantially identical to the device of FIGS. 3A, 3B, and the electric field lines in operation are also substantially as shown therein. Structure 100 contains, in addition a second screen electrode 102, which in the preferred embodiment is both closely spaced to the screen 101, and preferably also has wider apertures than screen 101. Most basic to the invention is the maintenance of a higher acceleration field between screen 102 and the dielectric member 40, than the field existing between the two screens, from which the desirability of these other two properties follows. Specifically, the higher acceleration field is maintained so that at the aperture of screen 102 a focusing electric field, indicated by equipotential line FF, exists.

It will be appreciated that the screen apertures are quite small, e.g, 0.1 to 0.2 millimeters diameter, so that the field produced by the infinite plate 42 penetrates at most a small distance into the apertures. By making the apertures of screen 102 larger than (e.g., about 1.1 to 2 times as large as) those of screen 101 the strong acceleration external field presents a focusing contour across the whole aperture and extending deeply toward electrode 101.

It will further be appreciated that the efficiency of extraction of charge carriers from the glow chamber 107 depends on the presence of a strong accelerating field to capture the particles at the inner aperture of screen 101. Desirably, the field gradient should be in the range of 1–2,000 V/mm.

In order to obtain a suitable extraction field yet still be able to establish a stronger field between elements 102 and 40, the inner acceleration field is achieved by providing a thin spacer layer 103 between the two screens, and applying only a moderate potential therebetween. For example, with a potential difference of fifty volts and spacer layer 103 one or two mils thick an extraction gradient of 1000 V/mm to 2000 V/mm is achieved. By positioning the outer screen 102 the usual spacing of 0.2 millimeters from member 40 at a near normal bias of 500 volts a higher accelerating field gradient of 2500 V/mm is achieved. Operated in this manner the double screen configuration creates a strongly focusing electrostatic lens and thus the beam is very narrowed. It is understood that if the gap is doubled, thus decreasing the acceleration gradient, the interscreen potential must be decreased accordingly, or the thickness of spacer 103 increased, in order to maintain the external field strength greater than the inter-screen field strength so that both screens together perform a focusing effect.

Figure 5A:
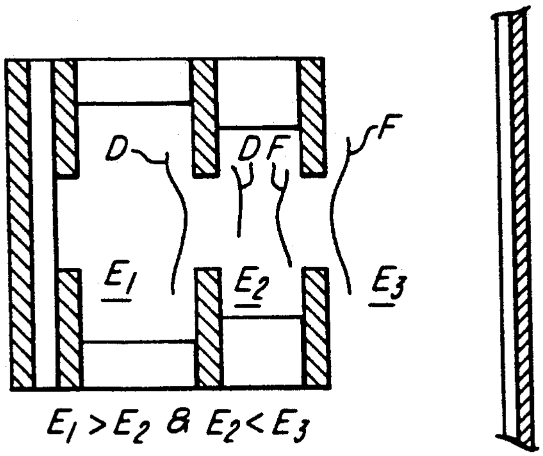
FIGS. 5A to 5C illustrate field lines and charge particle trajections of the printhead of FIG. 4 with different applied voltages.
Figure 5B:
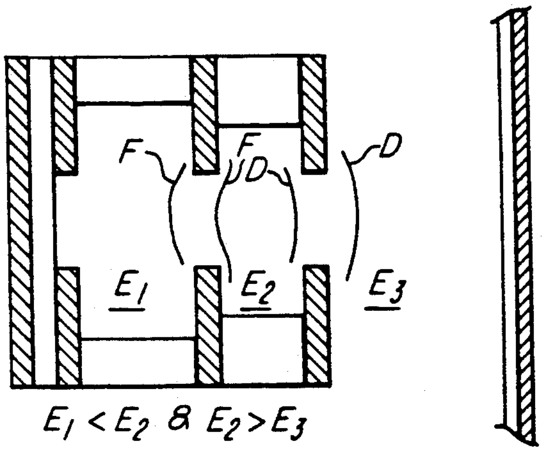
Figure 5C:
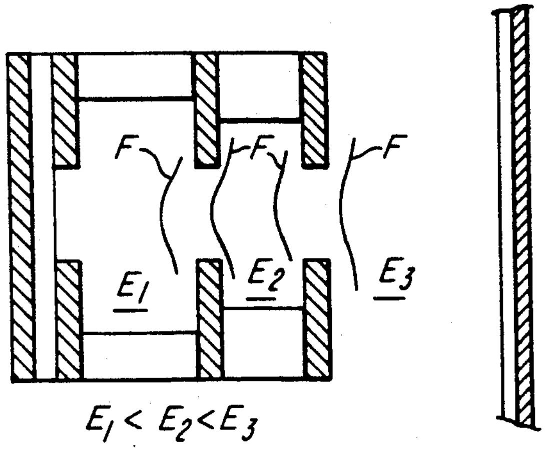

FIGS. 5A–5C illustrate the effects of the relative field strengths of the interscreen and the screen-to-drum spaces, specifically FIGS. 5A–5C illustrate the different focusing or diverging effects obtained with different relative magnitudes of electric field $E_1$, $E_2$, and $E_3$ within the cavity 107, between the screen electrodes, and in the printhead-to-drum gap, respectively. A representative field line is drawn on each side of the transition regions, together with an indication of whether the electrostatic lensing effect is focusing (F) or diverging (D). In practice, the cavity field is poorly understood owing to the intense corona activity inside, and the rapidly changing RF oscillations. The finger screen bias is therefore set in a conventional manner to gate a desired amount of charge. As shown in the diagrams, however, the relative strengths of $E_2$ and $E_3$ are important, with the condition of $E_3 > E_2$ assuring a further focusing effect.

It will be noted that the front screen electrode of these Figures is shown as having an aperture size identical to that of the rear screen electrode. This may help to form an effective intermediate field with relatively low potential differences.

Further embodiments for achieving enhanced charge deposition are shown in FIGS. 6–9.

Figure 6:
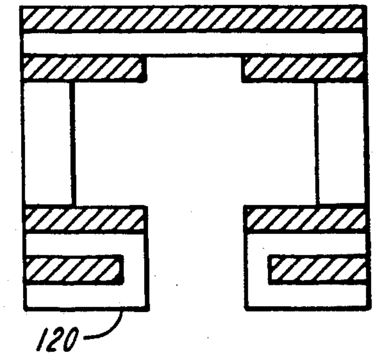
FIGS. 6, 7 and 8 illustrate other embodiments of printheads in accordance with the present invention.

As illustrated in FIG. 6, the front screen electrode is coated with a film 120. This may be a vapor- or solvent-deposited coating, a sputtered-on dielectric, or other coating. It may be a conductive coating that is applied as a protective coat against arcing and corrosive byproducts, but preferably is a thin dielectric coating which is charged by the covered screen electrode to provide a relatively smooth field around the aperture edges. The inner screen remains uninsulated.

Figure 7:
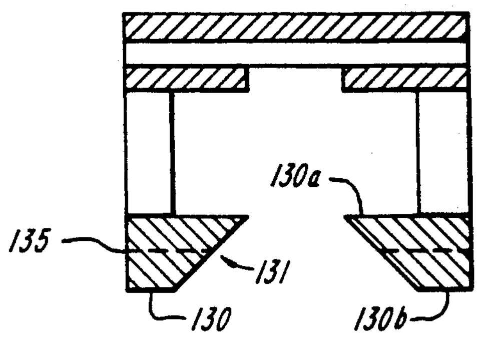
Figure 8:
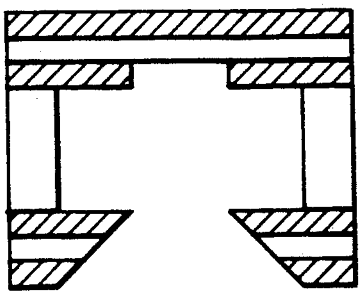

FIG. 7 shows another embodiment, wherein a single screen electrode 130 is employed. Screen 130 is a thick screen, such that its face defining the extraction aperture provides a constant-potential funnel for shaping the external gap field into a deeply penetrating focusing field. That is, the aperture may be outwardly beveled toward the imaging member. The thick electrode may be formed by several layers 130*a*, 130*b* joined along surface 135. The bevel may be fabricated by etching. FIG. 8 shows a related embodiment, wherein a beveled opening is provided through electrically separated screen electrodes.

In one representative prototype of a printhead constructed in accordance with the invention, and having the structure illustrated in FIG. 4, the opening in finger electrode 12 was six mils in diameter and spacer 112 defined a cavity six mils in depth The first screen 101 was formed of one mil thick stainless steel having a 7.5 mil aperture, which was spaced two mils from the front screen 102. Screen 102 was formed of identical material and had apertures of 9.5 mil diameter in registry with those of the underlying structure. An interscreen potential difference of approximately fifty volts, and a screen drum potential difference of approximately six hundred fifty volts were applied, at a gap of 0.3 mm, providing successive accelerating field of $E_2 = 1000$ V/mm and $E_3 = 2200$ V/mm, respectively.

The foregoing constructions illustrate the principles of the invention, but are subject to variation and modification in accordance with the numerous considerations involved in implementing printers of different architectures. For example, one of the two screen electrodes may be implemented as plurality of separately energized strip electrodes and the voltage on each strip may be varied to adjust the beam diameter to compensate for drum curvature effects. Another construction contemplated by the invention is to hold constant the high-voltage front screen to drum potential, and vary the voltage of the inner screen to adjust the amount of charge extracted from the printhead. This adjustment may be used to control print density.

The invention being thus described, other variations and modifications thereof will occur to those skilled in the art, and all such variations and modifications are considered to lie within the scope of the invention to which an exclusive right is claimed, as defined in the claims appended hereto.

What is claimed is:

1. A printhead for depositing a pointwise pattern of charge on an imaging member, such printhead comprising generation means including an array of generation electrodes actuable to generate charged particles in a localized region, extraction means for extracting charged particles from the region and including at least one layer of apertured electrode elements wherein apertures define the positions of latent charge image dots, and electrical means for establishing a potential difference between electrode elements and the imaging member defining a focusing field for focusing charged particles as they are extracted through the apertures and directed toward the imaging member.

2. The printhead of claim 1, wherein the extraction means includes first and second apertured electrode elements spaced apart along a direction of travel of the charge particles, and wherein the electrical means applies potentials to the electrode elements such that a beam of charged particles is focused in passing through an aperture of the first electrode element, and is focused in passing through an aperture of the second electrode element, thereby narrowing the beam.

3. The printhead of claim 2, wherein the electrical means applies plural different potentials to the first electrode, the second electrode and the imaging member to maintain a greater acceleration field strength between the second electrode and imaging member, than between the first electrode and the second electrode.

4. The printhead of claim 3, wherein the electrical means applies a potential difference greater than 500 volts between the imaging member and the second electrode.

5. The printhead of claim 1, wherein a layer of apertured electrode elements nearest the imaging member includes a thick conductive element having a face defining an extraction aperture that is beveled outwardly toward the imaging member to define equipotential lines of a focusing extraction field that extends into the aperture.

6. An improved printing system of the type wherein an electrographic printhead is positioned opposite an imaging surface to deposit a pointwise pattern of charge dots on the imaging surface for development into a visible image, wherein the improvement resides in the printhead comprising generation means including an array of generation electrodes actuable to generate charged particles in a localized region, extraction means for extracting charged particles from the region and including at least one layer of apertured electrode elements wherein apertures define the positions of latent charge image dots, and electrical means for establishing a potential difference between electrode elements and the imaging member defining a focusing field for focusing charged particles as they are extracted through the apertures and directed toward the imaging member whereby dot blooming of deposited charge is diminished.

7. The improved printing system of claim 6, wherein the extraction means includes first and second apertured electrode elements spaced apart along a direction of travel of the charge particles, and wherein the electrical means applies potentials to the electrode elements such that a beam of charged particles is focused in passing through an aperture of the first electrode element, and is focused in passing through an aperture of the second electrode element, thereby narrowing the beam.

8. The improved printing system of claim 7, wherein the electrical means applies plural different potentials to the first electrode, the second electrode and the imaging member to maintain a greater acceleration field strength between the second electrode and imaging member, than between the first electrode and the second electrode.

9. The improved printing system of claim 8, wherein the electrical means applies a potential difference greater than 500 volts between the imaging member and the second electrode.

10. The improved printing system of claim 6, wherein a layer of apertured electrode elements nearest the imaging member includes a thick conductive element having a face defining an extraction aperture that is beveled outwardly toward the imaging member to define equipotential lines of a focusing extraction field that extends into the aperture.

11. The improved printing system of claim 6, wherein the printhead is positioned at least 0.4 mm from the imaging member to deposit a non-diverging beam of charged particles while decreasing the likelihood of arcing.

* * * * *